United States Patent [19]

Giovannelli et al.

[11] Patent Number: 4,736,394
[45] Date of Patent: Apr. 5, 1988

[54] INTERFACE CIRCUIT FOR TRANSMITTING AND RECEIVING DATA

[75] Inventors: Roberto Giovannelli; Paolo Lazzeri, both of Pisa, Italy

[73] Assignee: Ing. C. Olivetti & C., S.p.A., Ivrea, Italy

[21] Appl. No.: 845,235

[22] Filed: Mar. 28, 1986

[30] Foreign Application Priority Data

Mar. 28, 1985 [IT] Italy ................ 67305 A/85

[51] Int. Cl.$^4$ ............................. H04L 23/00
[52] U.S. Cl. ..................... 375/121; 375/36; 340/825.5
[58] Field of Search .............. 375/7, 8, 36, 121; 178/3, 69 R; 370/85, 94; 340/825.5

[56] References Cited

U.S. PATENT DOCUMENTS

| | | | |
|---|---|---|---|
| 3,876,868 | 4/1975 | Cramwinkel et al. | 340/825.5 |
| 4,045,774 | 8/1977 | Morrison | 340/825.5 |
| 4,199,661 | 4/1980 | White et al. | 370/91 |
| 4,317,207 | 2/1982 | Fujimura et al. | 375/121 |
| 4,375,103 | 2/1983 | Arneth et al. | 375/121 |
| 4,463,351 | 7/1984 | Chiarottino | 340/825.5 |
| 4,602,252 | 7/1986 | Nakata et al. | 340/825.5 |
| 4,617,565 | 10/1986 | Nakata et al. | 340/825.5 |
| 4,622,550 | 11/1986 | O'Connor et al. | 370/85 |
| 4,633,489 | 12/1986 | Morishita | 375/121 |

FOREIGN PATENT DOCUMENTS 2074819 11/1981 United Kingdom .

OTHER PUBLICATIONS

Patnaik, "Salan: A Microprocessor-Based Medium Speed Experimental Local Area Network", Interface in Computing, Feb. 1984, pp. 229–240.
Moelands "The I$^2$C Bus-An Interface Structure for Integrated Circuits", Wescon Techincal Paper, vol. 27, 1983, pp. 1–5.

Primary Examiner—Robert L. Griffin
Assistant Examiner—Stephen Chin
Attorney, Agent, or Firm—Banner, Birch, McKie & Beckett

[57] ABSTRACT

An interface circuit for transmitting and receiving binary data as between a plurality of transmitting/receiving units such as for example electronic typewriters which are connected together. The circuit is suitable for transmitting and receiving data and timing (clock) pulses on two different lines, at a frequency particular to the transmitting unit. The circuit is provided with a binary counter prior to the transmission of data, the clock line is sampled to establish if the line is free and thus ready to receive, or occupied.

8 Claims, 3 Drawing Sheets

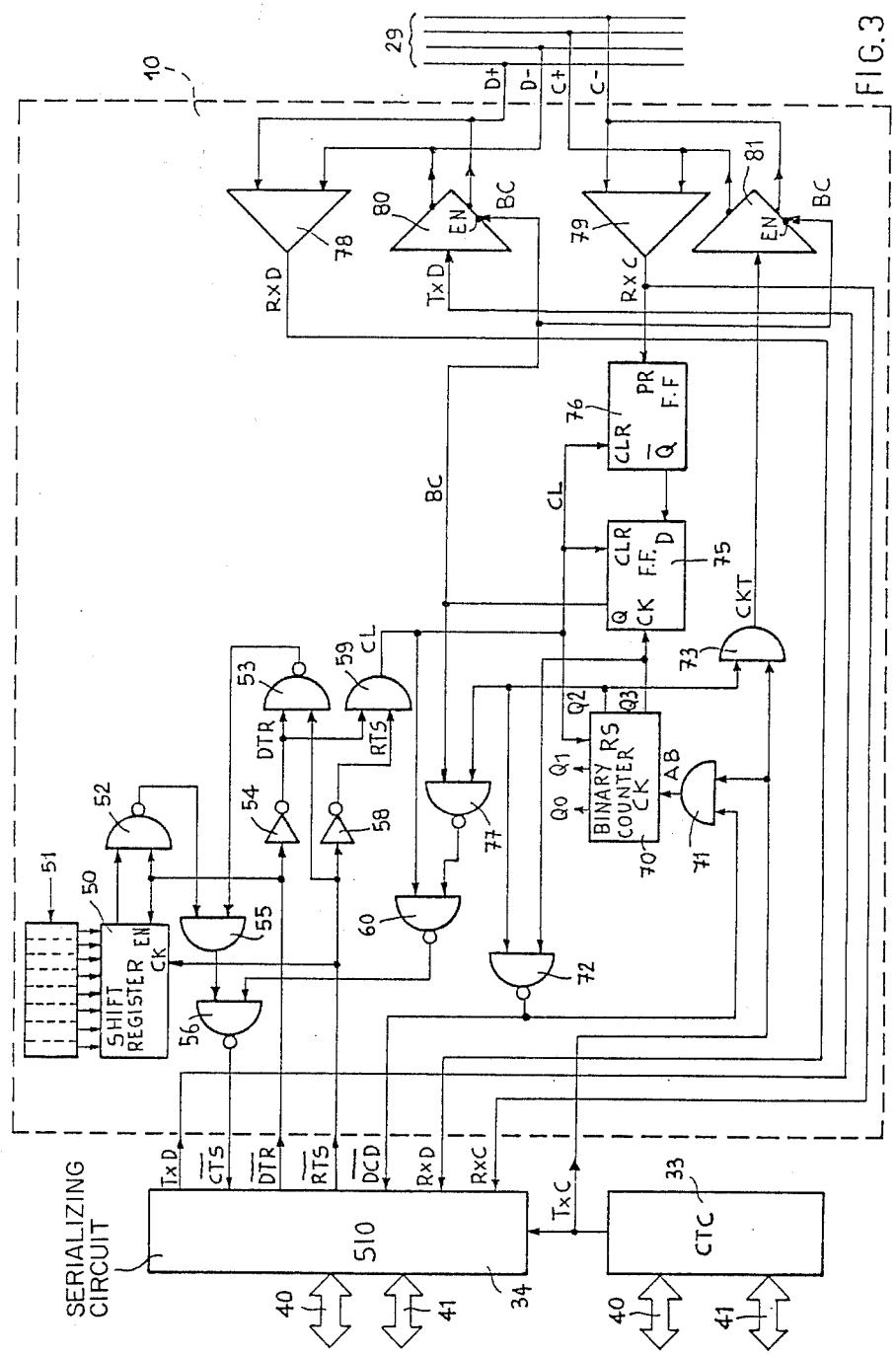

INTERFACE CIRCUIT FOR TRANSMITTING AND RECEIVING DATA

BACKGROUND OF THE INVENTION

The present invention relates to an interface circuit for transmitting and receiving binary data as between a plurality of transmitting/receiving units which are connected together by a data line and by a clock line for data and timing pulses, and in which each of the transmitting/receiving units comprises a circuit for transmitting and receiving in a serial mode binary data on the data line, and in which clock pulses on the clock line synchronize the data to be transmitted.

Normally, the transmitting/receiving units which are connected together to form a local network of terminals are managed by a pilot or master unit which controls the flow of information from one peripheral unit to another, enabling a connection from time to time between the units which are to exchange information. In that type of connection, the transmitting frequency is predetermined and is constant for all the peripheral units.

SUMMARY OF THE INVENTION

The technical problem that the present invention seeks to solve is that of providing an interface circuit which permits the transmission and reception of data from any one of the transmitting/receiving units to any other one of the units connected thereto, and wherein such transmission and reception may take place at frequencies which are not predetermined and which are thus also different from each other.

That technical problem is solved by the interface circuit according to the invention which is characterised by means for detecting at the beginning of each transmission the presence of at least a of clock pulse on the clock line, independently of the frequency of the clock pulses, in order consequentially to enable the transmitting circuit to transmit serially the binary data at a frequency particular to the transmitting unit when the clock line is found to be free.

These and other features of the invention will be clearly apparent from the following description of a preferred embodiment which is given by way of non-limiting example with reference to the accompanying drawings in which:

BRIEF DESCRIPTION OF THE DRAWINGS

FIG. 3 is a diagram of the interface circuit according to the invention.

DESCRIPTION OF THE PREFERRED EMBODIMENTS

Figure 1:
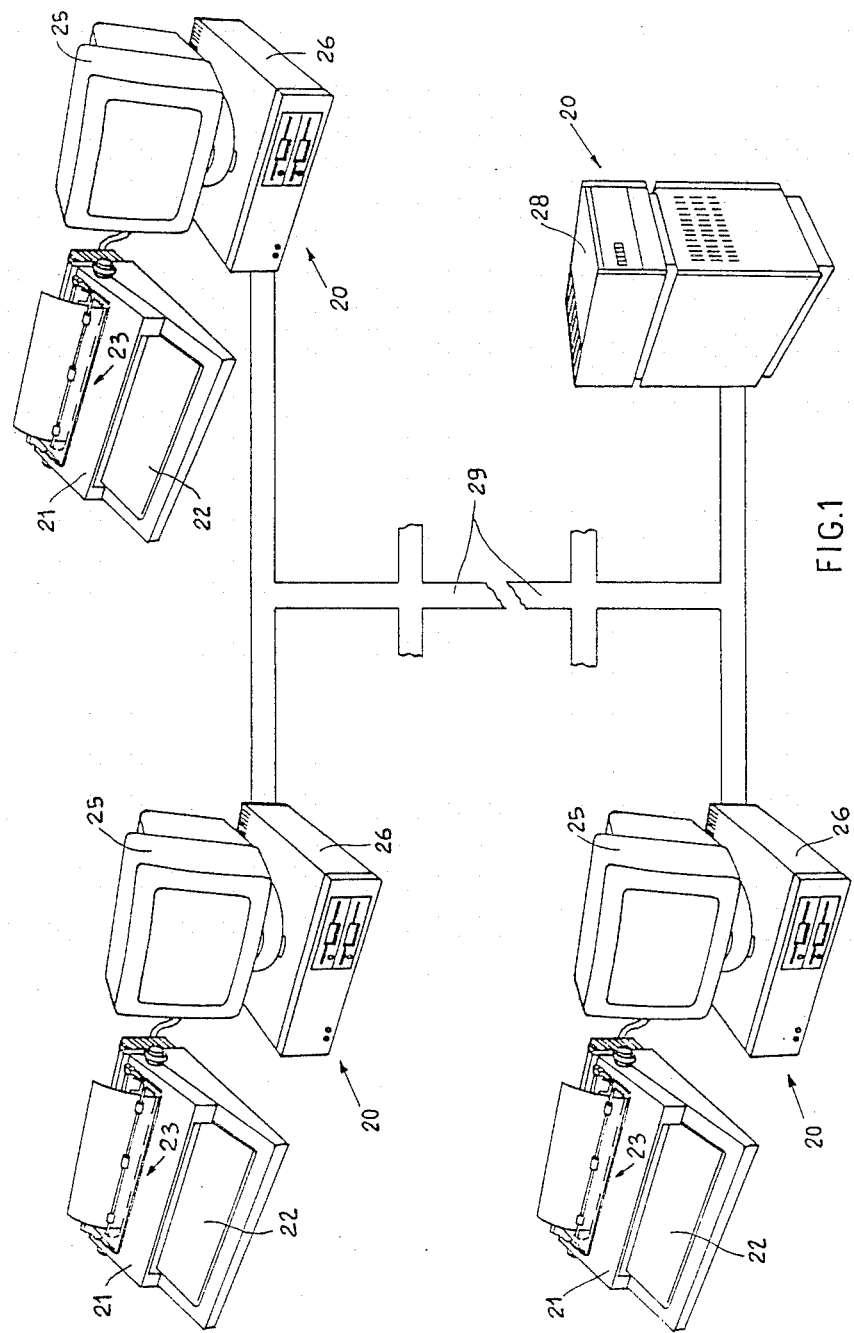
FIG. 1 is a diagrammatic view showing a plurality of interconnected transmitting/receiving units.
Figure 2:
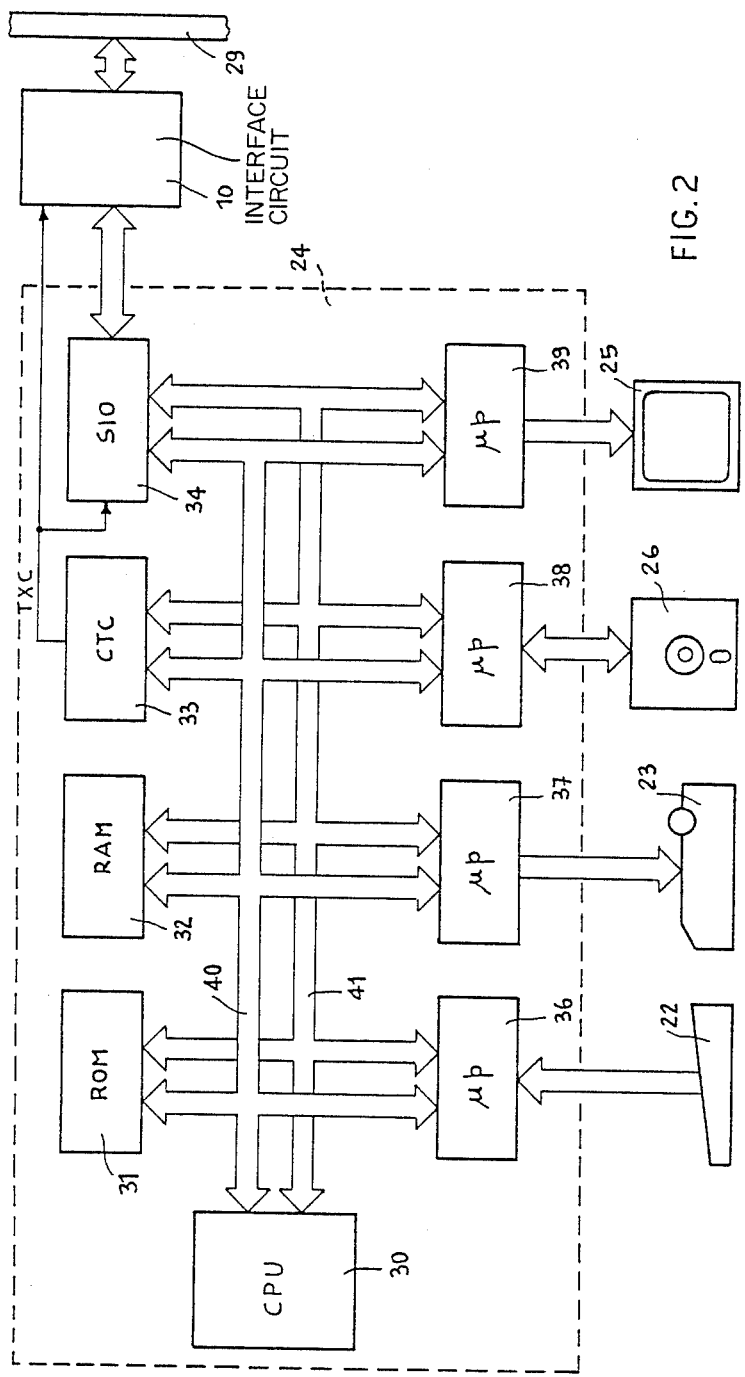
FIG. 2 is a block circuit diagram showing a circuit according to the invention applied to one of the transmitting/receiving units of FIG. 1.

Referring to FIGS. 1 and 2, an interface circuit 10 (LNI) is shown applied to each of the transmitting/receiving units 20 which make up a local network of terminals, each one of which may transmit and receive information from any one of the others, by way of a line 29.

Each unit 20 comprises for example a typewriter 21 having a keyboard 22, a printer 23 and an electronic circuit 24, and connected to a video unit 25 and to a unit 26 for processing magnetic floppy discs (Floppy Disc Unit). The local network further comprises a high-capacity memory unit 28, such as for example a unit for processing magnetic hard discs (Hard Disc Unit).

The electronic circuit 24 (FIG. 2) comprises a central processing unit (CPU) 30, a read only memory (ROM) 31, a random access memory (RAM) 32, a counter and timer circuit (CTC) 33 and a circuit 34 for serializing the input and output of data (SIO). The components 30, 31, 32, 33 and 34 are all of known type and may for example be formed by integrated circuits from the line of products Z80, from Zilog Inc.

The circuit 24 further comprises four microprocessors ($\mu$p) 36, 37, 38 and 39 which are capable of controlling the keyboard 22, the printer 23, the floppy disc unit 26 and the video unit 25 respectively, in known manner. The central unit 30 is connected to the ROM 31, to the RAM 32, to the CTC 33, to the SIO 34 and to the microprocessors 36, 37, 38 and 39 by means of a data bus 40 and an address bus 41.

The interface circuit 10 (FIGS. 2 and 3) is interposed between the circuit SIO 34 and the transmitting/receiving line 29, and is also connected to the circuit CTC 33.

In particular, the circuit 10 comprises a shift register 50 which is connected to a series of eight microswitches 51 which can be selected manually, and to two outputs $\overline{RTS}$ and $\overline{DTR}$ of the circuit SIO 34, which are indicative of the data transmission request and data terminals ready respectively.

The output of the register 50 is connected to one of the inputs of an NAND-gate 52, with the signal $\overline{DTR}$ arriving at the other input of the gate.

The circuit 10 further comprises a NAND-gate 53 whose inputs receive the signal $\overline{RTS}$ and a signal DTR which is the signal $\overline{DTR}$ inverted by an inverter 54. The outputs of the gates 52 and 53 are connected to the inputs of an AND-gate 55 whose output is connected to an input of a NAND-gate 56. The signal DTR and a signal RTS which is the signal $\overline{RTS}$ inverted by an inverter 58 are the inputs of an AND-gate 59 whose output is connected to an input of a NAND-gate 60. The output of the gate 60 is connected to an input of the NAND-gate 56 which is capable of generating a signal $\overline{CTS}$ (Clear To Send) for enabling transmission, which is passed to the circuit SIO 34.

The circuit 10 further comprises a four bit binary counter 70 which has a clock input CK, a reset input RS and four outputs Q0, Q1, Q2 and Q3. The input CK of the counter 70 receives a counting signal AB generated by an AND-gate 71, while the input RS of such counter 70 receives a reset signal CL generated by the AND-gate 59. The outputs Q2 and Q3 of the counter 70 are applied to the two inputs of a NAND-gate 72 which is capable of generating a signal $\overline{DCD}$ (Data Carrier Detect) for data carrier detection purpose, which is passed to the circuit SIO 34. The signal $\overline{DCD}$ and a transmission clock signal TxC generated by the circuit CTC 33 are applied to the inputs of the AND-gate 71. The signal Q2 and the signal TxC are applied to the inputs of an AND-gate 73 which is operable to generate the effective transmission clock signal CKT.

The circuit 10 also comprises two flip-flops 75 and 76 which are contained for example in an integrated circuit of type SN 74LS74 from Texas Instruments, which receive the signal CL at an input CLR. At an input CK the flip-flop 75 receives the signal Q3 generated by the binary counter 70 and generates a signal BC at its output Q. An input D of the flip-flop 75 is connected to an output $\overline{Q}$ of the flip-flop 76 which at its preset input PR receives a reception clock signal R×C.

The signal BC is applied to an input of a NAND-gate 77, another input of which receives the signal Q2 generated by the binary counter 70. The output of the NAND-gate 77 is connected to an input of the NAND-gate 60.

The circuit 10 further comprises four components 78, 79, 80 and 81 which are capable of performing the function of a line drive in known manner. The components 78, 79 and 80, 81 respectively may be for example of the type contained in the integrated circuits SN 74175 and SN 75174 respectively from Texas Instruments, and are therefore not described in detail herein. The inputs of compenents 78 and 79 and the outputs of components 80 and 81 are connected to the line 29 and in particular to the data line D+ and D− and to the clock line C+ and C−.

The component 78 is operable to generate a data receiver signal R×D every time on the data line is detected a difference between D+ and D−, while the component 79 is operable to generate the signal R×C every time on the clock line is detected a difference between C+ and C−. Signals R×C and R×D are passed to the circuit SIO 34. The component 80 is operable to receive a data transmitter signal T×D from the circuit SIO 34, and the component 81 receives the effective trasmission clock signal CKT. The components 80 and 81 are capable to be enabled to transmit by signal BC generated by flip-flop 75.

The mode of operation of the above-described circuit is as follows:

Normally the line drivers 78 and 79 are enabled to receive clock and data from the line 29 and to pass same directly to the circuit SIO 34 by means of the signals R×C and RxD, while the line drivers 80 and 81 are disenabled.

The circuit SIO 34, according to a predetermined software procedure of the program of CPU 30, is capable to determine, every time it receives a frame of data from line 29, if such frame of data is actually for that particular unit 20 of the network. In fact, during an initializing phase of the network, in a known manner and under control of CPU 30, the circuit SIO 34 performs a reading cycle of the shift register 50. More in particular, to do that, the circuit SIO 34 causes the signal $\overline{DTR}$ to pass to level 1, enabling the register 50 and disenabling the transmission, through the AND-gate 59 which causes its output signal CL to pass to level 0. The register 50 is read utilizing the signal $\overline{RTS}$ which clocks the same register 50. The eight bits code stored into the register 50 is then transferred into an internal register (not shown in the drawing) of the circuit SIO 34 through the gates 52, 55 and 56 so that, every time a frame of data arrives from line 29, the circuit SIO 34 can compare the eight bit code stored in its internal register with the eight bit address contained at the beginning of each frame of data to determine if such frame of data shall be or not received and transmitted to the CPU 30.

When data are to be transmitted by one of the units 20, first of all the line 29 is sampled to find out if a transmission is already taking place on the line 29. To do that, according to a characteristic of the invention, the circuit 10 verifies if at least one clock is arriving from line 29. More in particular, the circuit SIO 34 causes the signals $\overline{DTR}$ and $\overline{RTS}$ both to pass to level 0, so that the output signal CL of the AND-gate 59 goes to level 1 causing the reset of flip-flops 75 and 76 and of the binary counter 70 which causes all its outputs Q0–Q3 to go to level 0. In such condition the NAND-gate 72 causes its output signal $\overline{DCD}$ to pass to level 1, so that the AND-gate 71 is enabled to pass every clock pulse T×C, generated by the circuit CTC 33, to the binary counter 70, while the AND-gate 73 remains disenabled and the signal CKT is maintained to level 0.

The binary counter 70 counts the clock pulses T×C and causes its output Q3 to pass to level 1 after the counting of eight clocks. During such period of time if the signal R×C is switched at least one time from level 1 to zero, for the presence of a clock signal on the line 29 or a switching to zero of lines C+ and C−, also the output $\overline{Q}$ of the flip-flop 76 goes to level 0, and remains to such level 0 until a new reset is operated by signal CL. In this manner, when the output Q3 of the counter 70 goes to level 1, the valve of $\overline{Q}$ is transferred on the output Q of the flip-flop 75, so that the signal BC, which is capable to enable the transmission drivers 80 and 81, remains to level 0 (drivers 80 and 81 disenabled) when the line 29 is occupied, while it goes to level 1 (drivers 80 and 81 enabled) when the line 29 is free.

The binary counter 70 continues to count the clock pulses T×C until both its outputs Q2 and Q3 go to level 1, after twelve clocks from the beginning of the counting. In this condition in fact, the NAND-gate 72 causes its output signal $\overline{DCD}$ to pass to level 0 so that the AND-gate 71 does not enable the clock signals T×C to pass to the counter 70.

During the period of time from the eighth clock until the twelfth clock received by the counter 70, if the drivers 80 and 81 are enabled by signal BC, the signal CKT, which remains to level 0, keeps the line 29 occupied, so that such condition can be immediately detected by the other units 20 of the network.

The result of the operation of sampling the line 29 determines also the logic value of the signal CTS which indicates if data can be transmitted ($\overline{CTS}$=0) or that the line is occupied ($\overline{CTS}$=1). If the line 29 is free, the data are then transmitted together with their timing clock at a frequency particular to the tramsitting unit 20.

It will be apparent that the interface circuit as described hereinbefore may be the subject of modifications and addition of parts without thereby departing from the scope of the present invention.

We claim:

1. An interface circuit of a transmitting/receiving unit for transmitting and receiving binary data to and from a plurality of transmitting/receiving units, wherein said transmitting/receiving units are connected together by a data line and by a clock line for data and clock pulses, respectively, in which each of said units comprises circuit means for transmitting and receiving in serial mode binary data on said data line, wherein said interface circuit comprises:

clock pulse generating means for generating clock pulses to be transmtited on the clock line to synchronize the data to be transmitted at a frequency particular to said transmitting/receiving unit;

detecting means for detecting at the beginning of each transmission and for a first period of time the presence of at least a clock pulse on said clock line independently of the frequency of said clock pulses;

enabling means connected with said detecting means and generating an enabling signal to enable said circuit means to transmit said binary data and said clock pulses, when said clock line is found to be free, during said first period of time;

means for keeping said clock line occupied in response to said enabling signal, from said first period of time to a given period of time greater than said first period of time and prior to the effective transmission of said binary data; and a control circuit for causing said interface circuit to transmit said binary data at the frequency particular to said transmitting unit, after said given period of time.

2. A circuit according to claim 1, wherein said detecting means comprise a binary counter connected to said clock pulse generating means and operable to count a first number and a given number of said clock pulses to define said first period of time and said given period of time, respectively.

3. A circuit according to claim 1, wherein said detecting means comprise means to detect switchings of signals on the clock line, a first store circuit clearable at the beginning of each transmission and connected to said means to detect switching to generate a control signal associated with said enabling signal to inhibit the transmission of data when one of said switchings is revealed after clearing at the beginning of each transmission.

4. A circuit according to claim 3, wherein said detecting means further comprise a binary counter connected to said clock pulse generating means and having a first output connection defining said first period of time and a second output connection defining said given period of time; a second store circuit having a first input controlled by the control signal of said first circuit store, a second input connected with the second output connection of said counter, and an output to send said enabling signal; and a clearing circuit to clear said counter and said first and second store circuits at the beginning of each transmission.

5. A circuit according to claim 4, wherein said control circuit comprises a gate means connected with the first output connection of said counter and enabled by a further ready signal to transmit said binary data only after said given period of time.

6. A circuit according to claim 5, wherein said enabling means for said clock pulses comprise a first gate circuit having the output connected with the clock line and two inputs of which a first input is enabled by said enabling signal; and wherein said means for keeping said clock line occupied comprises a second gate circuit having an output connected with a second input of said first gate circuit, one input connected with the second output connection of said counter, and another input connected with the clock pulse generating means for switching the clock line in an occupied status immediately after the enabling status of said first gate circuit.

7. An interface circuit for transmitting and receiving binary data between a plurality of transmitting/receiving units which are connected together by a data line and by a clock line for data and clock pulses, respectively, in which each of said units comprises circuit means for transmitting and receiving in serial mode binary data on said data line, and in which clock pulses on the clock line synchronize the data to be transmitted, wherein said interface circuit comprise detecting means for detecting at the beginning of each transmission and for a given period of time the presence of at least a clock pulse on said clock line independently of the frequency of said clock pulses, and means connected with said detecting means in order to enable said circuit means to transmit said binary data in serial mode, when said clock line is found to be free, at a frequency particular to the transmitting unit; and a clock pulse generator for generating clock pulses at said particular frequency, and wherein said detecting means comprise a binary counter connected to said clock pulse generator and operable to count a given number of said clock pulses to define said given period of time;

means to detect switchings of signals on the clock line;

a first store circuit clearable at the beginning of each transmission and connected to said means to detect switchings to generate a control signal inhibiting the transmission of data when one of said switchings is revealed after clearing at the beginning of each transmission, wherein said binary counter comprises first output connections defining a first period of time less than said given period of time and second output connections defining said given period of time; and wherein said interface circuit further comprises:

a gate means connected with said clock pulse generator and said first output connections of said counter;

a second store circuit having a first input controlled by the control signal of said first circuit store and second input connected with the second output connections;

a clearing circuit to clear said counter and said first and second store circuits at the beginning of each transmission; and transmission of data and clocks enable circuits enabled by an output of said second store means, and wherein the transmission of data and clocks enable circuits have one input connected with said gate means to transmit said clock pulses only after said given period of time.

8. An interface circuit for transmitting and receiving binary data between a plurality of transmitting/receiving units which are connected together by a data line and by a clock line, wherein each of said transmitting/receiving units comprises circuit means for transmitting and receiving in serial mode binary data on said data line, wherein clock signals are provided in the clock line for the timing of the data signals, wherein said interface circuit comprises clock pulse generating means for transmitting clock signals on the clock line for timing of binary data signals to be transmitted on the data line, wherein said clock pulses have a given frequency which is specific of the transmitting unit; detecting means for detecting switching of clock signals on the clock line for a given period of time at the beginning of each transmission; and enable transmission means operatively connected with said detecting means to enable transmission of said clock pulses at said given frequency when the clock line is found to be free; wherein said detecting means comprise:

a binary counter connected to said clock pulses generating means and operable to count a given number of said clock pulses to define said given period of time;

means to detect switchings of signals on the clock lines; and a first flip-flop circuit clearable at the beginning of each transmission and having an input connected to said means to detect switchings to generate a control signal inhibiting the transmission of data when one of said switchings is revealed after clearing at the beginning of each transmission, wherein said binary counter comprises first output connections defining a first period of time less than said given period of time and second output connections defining said given period of time; and wherein said interface circuit further comprises:

a gate means connected with said clock pulses generator and said first output connections;

a second flip-flop circuit having a first input controlled by the control signal of said first flip-flop circuit and a second input connected with the second output connections of said counter;

a clearing circuit to clear said counter and said first and said second flip-flop circuit at the beginning of each transmission; and transmission of data and clocks enable circuits enabled by an output of said second flip-flop circuit, and wherein the transmission of clocks enable circuit has one input connected with said gate means to transmit said clock pulses only after said given period of time.

* * * * *